Figure 1:
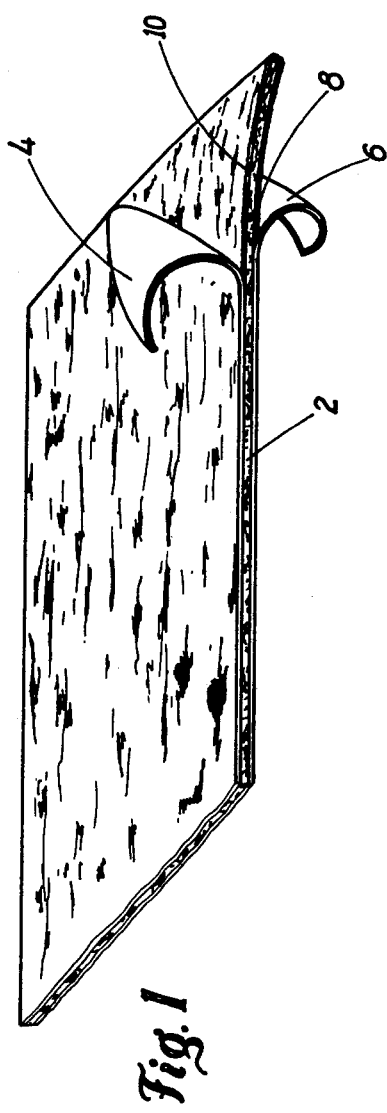

United States Patent [19]

Tarullo

[11] 4,130,685
[45] Dec. 19, 1978

[54] CORK WALL COVERING

[76] Inventor: John A. Tarullo, 4700 Robards La., Louisville, Ky. 40218

[21] Appl. No.: 507,725

[22] Filed: Sep. 20, 1974

[51] Int. Cl.² .................. B32B 21/08; B32B 27/30; B32B 27/36

[52] U.S. Cl. .................. 428/247; 428/249; 428/332; 428/339; 428/413; 428/424; 428/455; 428/481; 428/507; 428/511; 428/537

[58] Field of Search .............. 161/211, 88, 89, 190, 161/165, 184, 252, 249, 232; 117/68; 215/349, 350; 156/332, 330, 331; 428/455, 481–483, 537, 486, 507, 511, 247–249, 423, 424, 332, 339, 413, 334

[56] References Cited

U.S. PATENT DOCUMENTS

| 268,320 | 11/1882 | Urann | 428/455 |
|---|---|---|---|
| 2,005,638 | 6/1935 | Schacht | 161/211 |
| 2,393,843 | 1/1946 | Van Cleef | 161/211 X |
| 2,499,134 | 2/1950 | De Bruyne | 161/211 X |
| 2,560,420 | 7/1951 | Dodge | 428/455 |
| 2,584,959 | 2/1952 | Yocom et al. | 161/211 X |
| 2,601,318 | 6/1952 | Navikas | 161/211 X |
| 2,852,412 | 9/1958 | Hassel | 161/211 X |
| 2,961,365 | 11/1960 | Sroog | 161/232 X |
| 3,110,615 | 11/1963 | Keel | 428/423 X |
| 3,308,009 | 3/1967 | Baumgartner | 161/211 |
| 3,573,154 | 3/1971 | Tank | 428/455 X |

Primary Examiner—Harold Ansher
Attorney, Agent, or Firm—Charles G. Lamb

[57] ABSTRACT

A cork wall covering including a sheet of cork sandwiched between and adhesively secured to a backing material on one side and a polymerized vinyl resin material on the opposite or facing side.

6 Claims, 2 Drawing Figures

U.S. Patent

Dec. 19, 1978

4,130,685

CORK WALL COVERING

BACKGROUND OF THE INVENTION

This invention relates to a cork wall covering composition having a backing material on one side thereof and a facing material on the opposite side thereof and more particularly relates to a process for the manufacturing of a cork wall covering material.

Many different products have been suggested and used for wall coverings in the past few years. A large number of these coverings have been prepared from laminated products utilizing thin wood veneers with cloth or paper backings and attaching the laminated product to plywood, sheetrock or the like. Cork wall coverings have also been proposed wherein the cork has been generally attached to a cloth or paper backing and then adhesively secured to a sheet of plywood, sheetrock or directly to an already existing wall. It has also been suggested to coat the cork laminated wall coverings with vinyl coatings or lacquers at a thickness of 5 mils or less, thin coatings being suggested because of the natural resilience of the cork and with severe demands put upon the coating system the coating must withstand flexing and elongation and possess elasticity. However, the thin lacquer and vinyl coatings have not proved to be satisfactory. When the product has been worn to an amount equivalent to the thickness of the coating applied, the resulting worn product is then equivalent in wearing properties to a conventional cork surface covering and thus is subject from then on to all the tendencies of uncoated cork to be scratched, soiled and stained. Furthermore, attempts at applying films such as polyvinyl resin films have proven unsuccessful since it has been difficult to find the proper adhesives which will attach the polyvinyl resin films to the cork and yet expand and contract upon flexing and elongation of the cork without showing wrinkles, delamination or other distortions in the product.

SUMMARY OF THE INVENTION

The present invention advantageously provides a straightforward arrangement for preparation of a cork wall covering including polymerized vinyl film on the face thereof and a product resulting from this process.

Various other features of the present invention will become obvious to these skilled in the art upon reading the disclosure set forth hereinafter.

Particularly, the present invention provides a process of making a cork wall covering comprising the steps of: (a) placing a sheet of backing material onto one side of a sheet of cork with a thermoplastic adhesive being disposed therebetween; (b) adhering said backing material to said sheet of cork to form a two-ply sheet by subjecting said materials to preselected temperature and pressure for a preselected period of time; (c) flexing said sheet of cork and backing material by stress relieving sequentially each side of said two-ply sheet; (d) coating the opposite side of said cork sheet with a mixture of a polyester resin adhesive and a curing agent for said polyester resin; (e) placing a sheet of facing material onto said side of said cork sheet including said polyester resin adhesive; (f) adhering said facing material to said cork to form a three-ply sheet by subjecting said material to preselected temperature and pressure for a preselected period of time; and, (g) cooling said three-ply sheet to a preselected temperature.

Even more particularly, the present invention relates to a cork wall covering comprising a sheet of cork material adhesively secured on one side to a backing material by a first adhesive and having on the opposite side thereof a facing material adhesively secured thereto with a second adhesive, said first adhesive being a thermoplastic adhesive and said second adhesive being a cured polyester resin.

It is to be understood that the description and examples of the present invention given hereinafter are not by way of limitation. Various modifications within the scope of the present invention will occur to those skilled in the art upon reading the disclosure set forth hereinafter.

Figure 2:
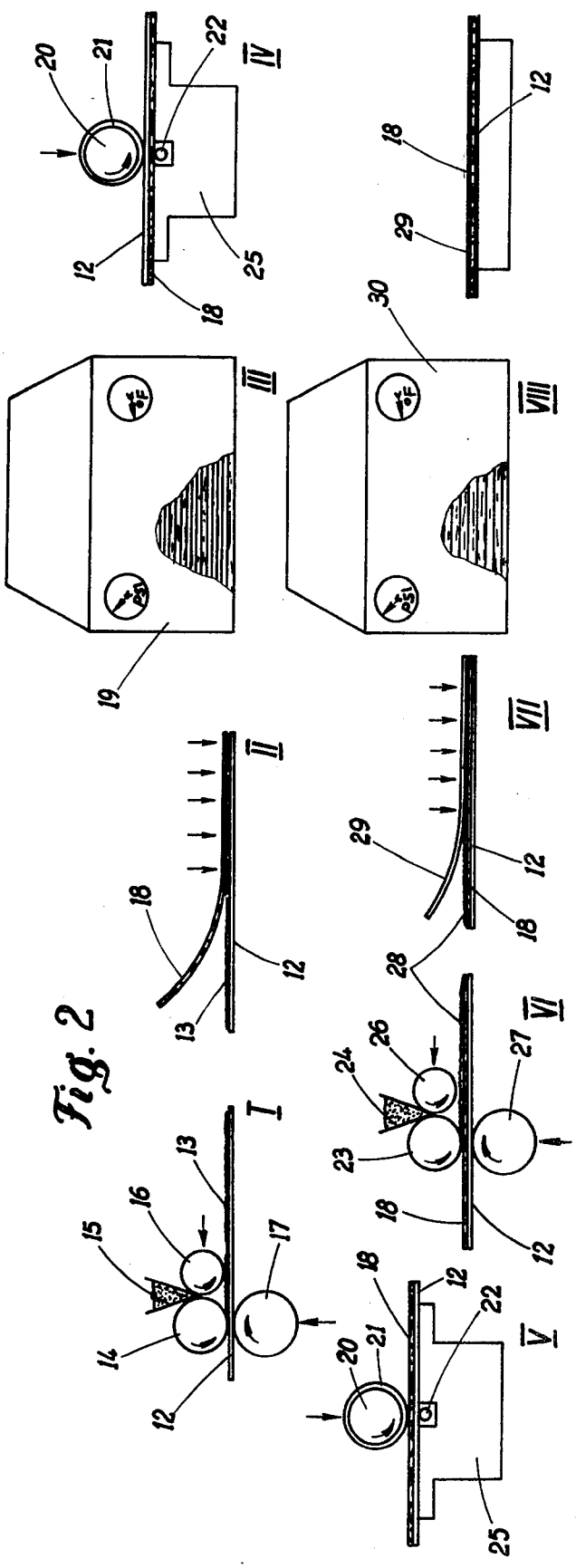

Referring to the drawing:

FIG. 1 is a perspective view, partially cutaway, of one preferred cork wall covering of the present invention; and, FIG. 2 is a flow scheme illustrating the various work stations and steps involved in one preferred process of the present invention.

Referring to FIG. 1 of the drawing, a sheet of cork 2 is disposed between a sheet of polyvinyl chloride film 4 and a cloth backing 6. The cork 2 is about 0.013 inch in thickness and is generally between about 0.006 and 0.040 inches thick. The polyvinyl chloride film exemplified as being about 0.006 inches in thickness will generally be from about 0.005 to 0.010 in thickness. Also, other polymerized vinyl resins may be used besides polyvinyl chloride, such as vinylchloride-vinyl acetate copolymers, polylower-alkyl acrylates, polylower-alkyl methacrylates and copolymers of said acrylates and methacrylates. The backing material 6, exemplified as cloth, may also be paper and as exemplified is generally between about 0.005 and 0.008 inches in thickness.

Means for attaching the cloth backing 6 to a cork sheet 2 is a first adhesive 8 which is generally a water base polyvinyl acetate thermoplastic setting material, but may be any other thermoplastic adhesive. Means for attaching the polyvinyl chloride sheet 4 to the cork sheet 2 is a second adhesive 10 which is exemplified as BOSTIK 7132, a solvent base synthetic resin in combination with a poly-isocyanate curing agent known as BOSCODUR #1, the two part adhesive being manufactured by BOSTIK Division of United Shoe Machine Company. It is realized that other adhesives may be utilized such as polyester resins with suitable curing agents, such as the epoxy resins and other polyisocyanates.

Referring to FIG. 2 of the drawing in carrying out a preferred process of the present invention, in Step I a preselected length of a sheet of backing material 12 which may be either cloth, paper or the like is covered on one side by an adhesive 13, the adhesive being applied by any known means, but exemplified as an adhesive applying means which consists of an applicator roll 14 which rotates in the same direction as the movement of the backing material 12 transferring a first adhesive from an adhesive containing pan 15 to the sheet 12, pan 15 being disposed between the applying roller 14 and a pressure roller 16, pressure roller 16 being adapted for setting the thickness of the adhesive. Disposed directly beneath the applying roller 14 is a pressure roller 17, pressure roller 17 being adapted to combine with applying roller 14 for adding the adhesive to the sheet 12. The adhesive utilized is a water-base polyvinyl acetate thermoplastic adhesive. However, it is realized that other thermoplastic adhesives may be utilized.

In Step II, a cork sheet 18 of substantially the same size as the sheet 12 is brought into contact with the adhesive 13, sufficient pressure being applied to enable the material to stick to the sheet 12. It is also realized that the adhesive may be added to the cork sheet first and then the backing sheet. However, in commercial applications, the backing sheet is generally purchased with the adhesive already attached thereto.

In Step III of the process, a plurality of the recently cut sheets are stacked into a press 19 wherein heat at from about 200° F. to 300° F. and a pressure of from about 175 to 250 psi are applied for a preselected period of time in order to complete the adhesion of the backing with the cork sheet. The time is generally from about 5 to 10 minutes for this step.

In Step IV the resulting two-ply material from the oven 19 is fed to a flexing device which includes a table 25 and a flexing roll 20, flexing roll 20 having a rubber surface 21 on the outside thereof and driven by a motor driving means (not shown). Disposed directly beneath the flexing roller 20 is a steel rod or roller 22 which rotates freely in the same direction as the sheet material, the distance between the roller 22 and the roller 20 being preselected depending on the thickness of the material being inserted therebetween. The flexing roller 20 under pressure relieves the tension or the stress on one side of the two-ply laminate passing therethrough, expanding or stretching the two-ply laminate a small amount.

In Step V the two-ply laminate is turned over and rerun through the same flexing machine thereby relieving the tension or stress in the laminate on the opposite side. The resulting two-ply laminate from Step V is a completely flexible material ready for coating by a polymerized vinyl film to the cork side of the laminate.

In Step VI the cork side of the laminate is passed under an adhesive applying roller 23 which is rotatable in the same direction as the movement of the laminated sheets, the adhesive being applied by transferring a second adhesive from an adhesive containing pan 24 to the cork side 18 of the laminate, the pan 24 being disposed between the applying roller 23 and a pressure roller 26, pressure roller 26 being adapted to set the thickness of the adhesive. Disposed directly beneath the applying roller 23 is a pressure roller 27, pressure roller 27 being adapted to combine with applying roller 23 for adding adhesive 28 to the cork side 18 of the sheet. The adhesive 28 utilized is an admixture of a polyester resin known as BOSTIK 7132, and a poly-isocyanate curing agent known as BOSCODUR #1. However, it is realized that other polyester resins cured with other curing agents such as epoxy resins may also be utilized.

In Step VII, polyvinyl chloride film 29 is applied under pressure to the adhesively coated laminate, the resulting product sheet being stacked with a plurality of other sheets which have just been coated with the polyvinyl chloride film in press 30.

In Step VIII, the plurality of sheets are subjected to a temperature of from about 200° F. to 300° F. and a pressure of from about 175 to 250 psi for a period of about ten to twenty minutes in order to set the adhesive. The resulting product, a three-ply laminate, is left in the press 30 and the press 30 is cooled to at least 50° F. in order to complete the set of the second adhesive. After the three-ply laminate has been allowed to stand for a preselected period of time at 50° F. in the press 30, it is then ready for use as a wall covering material. It is also realized that the laminated product may be used as a covering for furniture, shoes, shoe heels and the like as well as the wall covering.

It is also realized that various changes may be made to the specific embodiment shown and described without departing from the principles of the present invention.

What is claimed is:

1. A cork wall covering comprising a sheet of cork material of from about 0.006 to 0.040 inches in thickness adhesively secured to one side to a backing material of from about 0.005 to 0.008 inches in thickness by a first adhesive and having on the opposite side thereof a facing material of from about 0.005 to 0.010 inches in thickness adhesively secured thereto with a second adhesive, said backing material being cloth or paper, said facing material being a vinyl film, said first adhesive being a thermoplastic adhesive and said second adhesive being a cured polyester resin.

2. The cork wall covering of claim 1 wherein said thermoplastic adhesive is polyvinyl acetate.

3. The cork wall covering of claim 1 wherein said cured polyester resin includes an epoxy resin as a curing agent.

4. The cork wall covering of claim 1 wherein said cured polyester resin includes a poly-isocyanate as a curing agent.

5. The cork wall covering of claim 1 wherein said facing material is a polymerized vinyl film selected from the group consisting vinylchloride-vinyl acetate copolymers, polylower-alkyl acrylates, polylower-alkyl methacrylates, and copolymers thereof.

6. The cork wall covering of claim 1 wherein said facing material is polyvinyl chloride.

* * * * *